G. BRAVI.
SPRINGLESS OR FLOATING SUSPENSION FOR VEHICLES.
APPLICATION FILED NOV. 29, 1915.

1,229,708.

Patented June 12, 1917.

WITNESSES:

INVENTOR
Giuseppe Bravi
BY
W. W. Williamson
ATTORNEY

UNITED STATES PATENT OFFICE.

GIUSEPPE BRAVI, OF ALLENTOWN, PENNSYLVANIA, ASSIGNOR OF ONE-HALF TO SANTE T. ALLEVA, OF NORRISTOWN, PENNSYLVANIA.

SPRINGLESS OR FLOATING SUSPENSION FOR VEHICLES.

1,229,708. Specification of Letters Patent. Patented June 12, 1917.

Application filed November 29, 1915. Serial No. 63,911.

*To all whom it may concern:*

Be it known that I, GIUSEPPE BRAVI, a subject of the King of Italy, residing at Allentown, in the county of Lehigh and State of Pennsylvania, have invented new and useful Improvements in Springless or Floating Suspension for Vehicles, of which the following is a specification.

My invention relates to new and useful improvements in springless or floating suspension for vehicles, and has for its object to provide an exceedingly simple and effective device of this character whereby the use of springs is entirely eliminated for taking up the shock incidental to a vehicle traveling over rails or roadbeds.

A further object of the invention is to provide a suspension for vehicles of a class stated whereby the vehicle or vehicle body will be maintained in the same plane regardless of the up and down movement of the wheels in riding over unevennesses or other obstructions.

A still further object of the invention is to provide a vehicle truck with sliding wheel sets with portions of which coöperates movable members carried by the truck, said movable members coacting with equalizing bars in such manner that the coacting or adjacent parts operate as a variable triangle, said equalizing bars exerting a vertical and horizontal pressure on the movable members, said equalizing bars having the bolster suspended therefrom so that said bolster will always lie in the same plane, the shock incident to the up and down movement of the wheels being so distributed through the movable members and equalizing bar as to prevent its transmission to the vehicle or vehicle body.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this application, in which—

Figure 1:
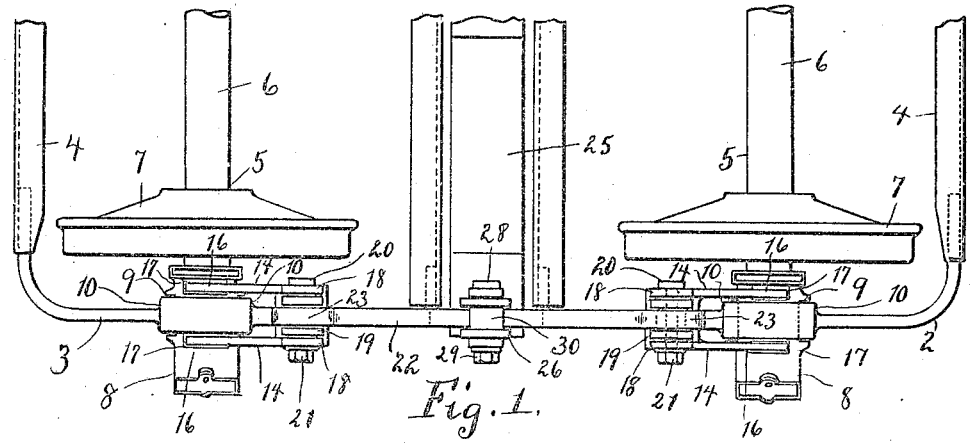
Figure 1, is a plan view of a truck embodying my invention, one half of said truck being broken away.
Figure 2:
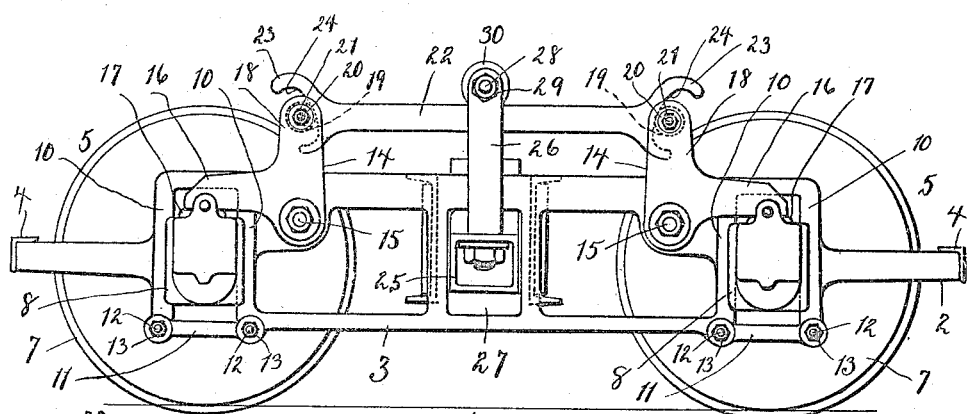
Fig. 2 is a side elevation thereof.
Figure 3:
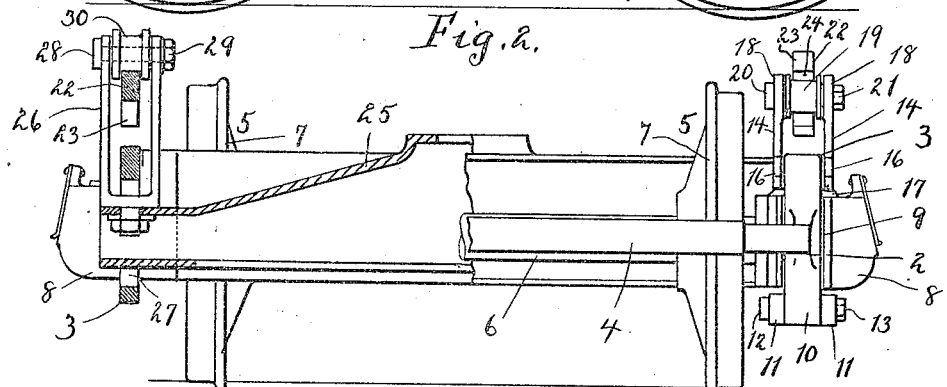
Fig. 3, is a front elevation thereof, one half of it being broken away and shown in section to clearly illustrate the construction.

It is to be understood that my invention is applicable to various forms of trucks and the running gear of various vehicles, and that it is not my intention to limit myself to the details of the construction of the truck as here shown as these are only to illustrate the principles of my invention as applied to one form of truck.

In carrying out my invention as here embodied 2 represents a truck frame comprising side pieces 3 and the end pieces 4 connected together, strengthened or braced in any suitable and well known manner. In the side pieces of the truck are slidably mounted the wheel sets 5 each set comprising an axle 6, a pair of wheels 7 and a journal box 8, the latter being grooved as at 9 to register with the journal box slides 10 formed from the side pieces of a truck frame, the journal box being situated in the spaces between the slides.

The journal box space between the slides 10 is open at one end, preferably the bottom, and after the journal box is in position, the opening of this space is closed by a pair of parallel closure bars 11 held in place in any suitable manner as by bolts 12 and notches 13, thus preventing the accidental disengagement of the journal boxes from the side pieces of the frame. At each end of each of the side pieces of the truck frame adjacent the journal boxes is pivoted a pair of spaced movable members or bell crank levers 14 as at 15. These spaced members are all identical and of each pair one member is pivoted on the outside of the truck frame side, while the other one is situated on the inside thereof and the horizontal arms 16 of these members each engage the top portion of a journal box, the latter being provided with contact projections 17 if found desirable in order that the like of the journal boxes may be increased. Between the outer ends of the vertical arms 18 of each adjacent pair of movable members is journaled an anti-friction roller 19, the same being mounted upon a bolt 20 or its equivalent passing through the vertical arms and having a nut 21 mounted thereon to prevent its displacement. The anti-friction rollers 19 or some suitable portion of the vertical arms of the movable members 14 on the same side of the truck frame are engaged by the ends of the equalizing bar 22, both ends of said equalizing bar being bifurcated to produce hooked fingers 23 to prevent the accidental displacement of the equalizing bar or to prevent the accidental disengagement of the ends of said equalizing bar from the movable members or bell crank levers or the anti-friction rollers carried thereby.

The bearing faces 24 of the equalizing bar situated at each end thereof between the fingers 23 project in opposite directions at an angle to the longitudinal center of the equalizing bar, or in other words said bearing faces 24 project upwardly and outwardly so that they contact with the movable members or the anti-friction rollers carried thereby tangentially and act as riding cams.

The bolster 25 on which is set the vehicle or vehicle body is suspended from the center of the equalizing bars 22 in any suitable manner such as by U shaped hangers 26 secured to the ends of the bolster 25 which project through openings 27 in the side pieces of the truck frame. In the upper ends of the U shaped hangers 26 are mounted axles in the form of bolts 28 or their equivalent held in place by nuts 29, and on each of these bolts is journaled a roller 30 engaging some suitable portion of the equalizing bars as the upper longitudinal edge.

From this description it will be seen that when the truck is traveling and the forward wheels come in contact with an obstruction over which they ride, the forward wheel set will be lifted or slide in the frame side pieces, and this lifting of the forward wheel set will raise the horizontal arms of the movable members 14, thereby throwing the vehicle arm 18 out of line about the pivot point 15, causing a variance of the angles or the imaginary triangle produced by the forward movable members and this action is transmitted through the equalizing bar 22 to the rear movable members 14 and through them to the rear wheel set causing the rear end of the truck frame to be elevated in the same proportion as the forward wheel set is elevated, or in the same proportion as the forward end of the truck frame is lowered with relation to the forward wheel set, thereby maintaining the load upon the bolster in substantially the same plane when the shock is so distributed or absorbed by the parts as to prevent its transmission to the vehicle body, since the bolster and therefore the vehicle body resting thereon is always maintained in substantially the same plane there will be no trouble in coupling a loaded car to an unloaded one, and since the amount of weight placed upon a car has no effect upon the working of the parts, the body of the vehicle will not swing upon its trucks at one time and rest solid thereon at another, the latter condition being extremely injurious to the tracks and roadbed over which such a car is operated.

Of course I do not wish to be limited to the exact details of construction as here shown, as these may be varied within the limits of the appended claims without departing from the spirit of my invention.

Having thus fully described my invention, what I claim as new and useful, is—

1. A springless or floating suspension comprising a truck having side pieces, journal boxes, bell crank levers pivoted to the side pieces and coacting with adjacent journal boxes, means coacting with each pair of bell crank levers pivoted to the same side piece, whereby said bell crank levers will be actuated in unison and in opposite directions, and a bolster suspended from said means.

2. A springless or floating suspension comprising a truck having side pieces, journal boxes, bell crank levers pivoted to the side pieces and coacting with adjacent journal boxes, means coacting with each pair of bell crank levers pivoted to the same side piece, whereby said bell crank levers will be actuated in unison and in opposite directions, a bolster, and means for swingingly suspending said bolster from said first named means.

3. A springless or floating suspension for vehicles comprising a truck having side pieces, spaced journal box slides situated at each end of said side pieces, means for closing the space between said slides, wheel sets including journal boxes slidably mounted between said slides, spaced bell crank levers pivoted to the side pieces and coacting with adjacent journal boxes and an equalizing bar having bearing faces at angles to the longitudinal center coacting with each pair of spaced bell crank levers pivoted to the same side piece.

4. A springless or floating suspension for vehicles comprising a truck having side pieces, spaced journal box slides situated at each end of said side pieces, means for closing the space between said slides, wheel sets including journal boxes slidably mounted between said slides, spaced bell crank levers pivoted to the side pieces, the horizontal arms of said bell crank levers coacting with adjacent journal boxes, an anti-friction roller mounted between the vertical arms of each pair of spaced bell crank levers, an equalizing bar having bearing faces at angles to its longitudinal center coacting with the rollers carried by the spaced bell crank levers pivoted to the same side piece, a hook at each end of the bearing faces to prevent the accidental displacement of the equalizing bar, a bolster the ends of which project through the side pieces, U shaped hangers for suspending said bolster from the equalizing bar, and an anti-friction roller carried by each hanger coacting with the equalizing bar.

In testimony whereof, I have hereunto affixed my signature in the presence of a subscribing witness.

GIUSEPPE BRAVI.

Witness:
MOLLIE TOBIAS.

Copies of this patent may be obtained for five cents each, by addressing the "Commissioner of Patents, Washington, D. C."